(12) United States Patent
Small

(10) Patent No.: US 9,436,307 B2
(45) Date of Patent: Sep. 6, 2016

(54) MODULATED BACK PLATE FOR CAPACITIVE SENSING

(71) Applicant: Synaptics Incorporated, San Jose, CA (US)

(72) Inventor: Jeffrey A. Small, Rochester, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 157 days.

(21) Appl. No.: 14/145,724

(22) Filed: Dec. 31, 2013

(65) Prior Publication Data

US 2015/0091846 A1 Apr. 2, 2015

Related U.S. Application Data

(60) Provisional application No. 61/886,029, filed on Oct. 2, 2013.

(51) Int. Cl.
*G06F 3/041* (2006.01)
*G06F 3/044* (2006.01)

(52) U.S. Cl.
CPC .......... *G06F 3/0412* (2013.01); *G06F 3/044* (2013.01)

(58) Field of Classification Search
CPC .... G06F 3/044; G06F 3/0412; G06F 3/0416; G06F 3/041; G06F 3/0418; G06F 3/042; G06F 3/3648; G06F 2203/04103; G02F 1/13338; G02F 1/1362; H01L 27/323
See application file for complete search history.

(56) References Cited

U.S. PATENT DOCUMENTS

| | | | |
|---|---|---|---|
| 6,373,474 B1 * | 4/2002 | Katabami | ............... 345/173 |
| 7,417,441 B2 | 8/2008 | Reynolds | |
| 7,583,092 B2 * | 9/2009 | Reynolds et al. | ............. 324/688 |
| 2002/0185981 A1 | 12/2002 | Dietz et al. | |
| 2008/0062148 A1 | 3/2008 | Hotelling et al. | |
| 2010/0001973 A1 | 1/2010 | Hotelling et al. | |
| 2010/0193257 A1 | 8/2010 | Hotelling et al. | |
| 2010/0194695 A1 | 8/2010 | Hotelling et al. | |
| 2010/0194707 A1 * | 8/2010 | Hotelling et al. | ............. 345/173 |
| 2010/0253638 A1 | 10/2010 | Yousefpor et al. | |
| 2010/0292945 A1 | 11/2010 | Reynolds et al. | |
| 2011/0007021 A1 * | 1/2011 | Bernstein et al. | ............. 345/174 |
| 2011/0284949 A1 | 11/2011 | Meng et al. | |
| 2011/0298746 A1 | 12/2011 | Hotelling | |
| 2012/0182251 A1 | 7/2012 | Krah | |
| 2013/0093722 A1 * | 4/2013 | Noguchi et al. | ............. 345/174 |
| 2013/0215075 A1 | 8/2013 | Lee et al. | |
| 2013/0293507 A1 * | 11/2013 | Singh | ............... G06F 3/044 345/174 |
| 2013/0314343 A1 * | 11/2013 | Cho et al. | .............. 345/173 |

OTHER PUBLICATIONS

Philippe Lambinet, FOGALE nanotech, May 22, 2013.
Dietz et al., "DiamondTouch: A Multi-User Touch", Mitsubishi Electric Research Laboritories, http://www.merl.com, Oct. 2003, consists of 11 pages.

* cited by examiner

*Primary Examiner* — Nalini Mummalaneni
(74) *Attorney, Agent, or Firm* — Patterson + Sheridan, LLP

(57) ABSTRACT

Embodiments described herein include an input device comprising a display device having an integrated capacitive sensing device, a processing system, and a method for detecting presence of an input object. In each of these embodiments, a modulation source provides modulation signals between a back plate and a system ground of the input device. Other embodiments include a display device having a capacitive sensing device, a processing system and a method for detecting presence of an input object using a capacitive sensing device, wherein the capacitive sensing device includes a matrix of discrete sensor electrodes.

21 Claims, 7 Drawing Sheets

MODULATED BACK PLATE FOR CAPACITIVE SENSING

BACKGROUND OF THE INVENTION

1. Field of the Invention

Embodiments of the present invention generally relate to a method and apparatus for touch sensing, and more specifically, a capacitive touch sensing device having a modulated back plate.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Many proximity sensor devices utilize an array of sensor electrodes to measure a change in capacitance indicative of the presence of an input object, such as a finger or stylus, proximate the sensor electrode. Many schemes are possible for capacitive touch sensing. In one scheme, "matrix sensing," sensor electrodes arranged in a grid or "matrix" are driven to generate a capacitive image. The sensor electrodes may be driven in an absolute capacitance mode, in which the sensor electrodes are driven with a signal to determine the degree of capacitive coupling between the sensor electrodes and an input object, if present.

Sensor electrodes driven in absolute sensing mode may experience effects related to parasitic capacitances between the sensor electrodes and conductive objects other than an input object. More specifically, conductive objects that are associated with the input device contribute to the capacitance sensed by a sensor electrode driven for capacitive sensing. The existence of parasitic capacitance reduces the ability to detect the presence of an input object. This issue is more acute in "in-cell" display embodiments, in which the sensing electrode is a part of a display pixel cell, and therefore the sensing electrode is very close to several conductive elements, such as the pixel electrode of a display cell, and the terminals of a pixel transistor, among others.

Thus, there is a need for an improved proximity sensor device.

SUMMARY OF THE INVENTION

Embodiments described herein include an input device comprising a display device having an integrated capacitive sensing device, a processing system, and a method for detecting presence of an input object. In each of these embodiments, a modulation source provides modulation signals between a back plate and a system ground of the input device. Other embodiments include a display device having a capacitive sensing device, a processing system and a method for detecting presence of an input object using a capacitive sensing device, wherein the capacitive sensing device includes a matrix of discrete sensor electrodes.

In one embodiment, an input device comprising a display device having an integrated capacitive sensing device is provided. The input device includes a system ground, a conductive back plate, a plurality of sensor electrodes, and a processing system. The conductive back plate is configured to be coupled to an input object. The processing system is coupled to the conductive back plate and the plurality of sensor electrodes. The processing system is configured to drive modulation signals onto the conductive back plate. The processing system is also configured to receive resulting signals with at least one of the plurality of sensor electrodes, the resulting signals comprising effects corresponding to the modulation signals. The modulation signals cause the conductive back plate and the input object to be modulated with respect to system ground.

In another embodiment, a method for capacitive sensing is provided. The method includes driving modulation signals onto a conductive back plate that is proximate to a display device having an integrated capacitive sensing device. The method also includes receiving resulting signals from at least one of a plurality of sensor electrodes that are included in the display device having the integrated capacitive sensing device, the resulting signals comprising effects corresponding to the modulation signals. The modulation signals cause the conductive back plate and an input object proximate to the at least one sensor electrode to be modulated with respect to system ground In yet another embodiment, a processing system for an input device is provided. The processing system includes a modulation source configured to drive modulation signals onto a conductive back plate that is proximate to a display device having an integrated capacitive sensing device. The processing system also includes a sensor module having sensing circuitry configured to receive resulting signals from at least one of a plurality of sensor electrodes that are included in the display device having the integrated capacitive sensing device, the resulting signals comprising effects corresponding to the modulation signals. The modulation signals cause the conductive back plate and an input object proximate to the at least one sensor electrode to be modulated with respect to system ground.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
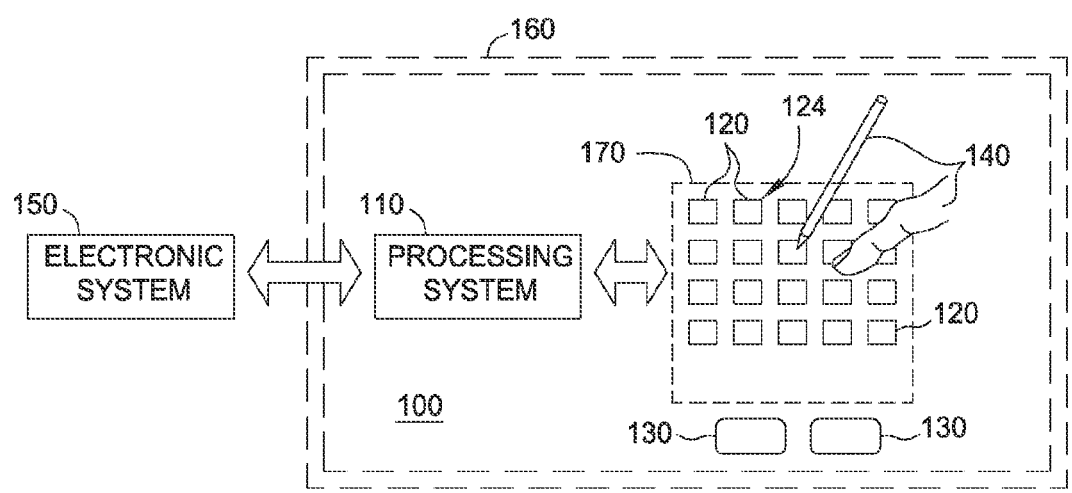
FIG. 1 is a schematic block diagram of an input device.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for reducing parasitic capacitance in a capacitive sensing input device. Particularly, embodiments described herein advantageously utilize a modulation source to modulate a back plate with respect to a system ground of the input device in order to modulate an input object that is capacitively coupled or conductively coupled to the back plate. Additionally, some other embodiments provide an input device integrated with a display device that includes a modulation source to modulate a back plate with respect to system ground.

FIG. 1 is a schematic block diagram of an input device 100, in accordance with embodiments of the present technology. Although the illustrated embodiments of the present disclosure are shown as an input device integrated with a display device, it is contemplated that the invention may be embodied in the input devices that are not integrated with display devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensing elements 124 for detecting user input. The sensing elements 124 include a plurality of sensor electrodes 120. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 124 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 124 to create electric fields. In some capacitive implementations, separate sensing elements 124 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground), and by detecting the capacitive coupling between the sensor electrodes 120 and input objects 140. In another implementation, a capacitive sensing method operates by modulating the input object 140 through a back plate and then detecting the capacitive coupling between the sensor electrodes 120 and the input object 140.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage (e.g., system ground) to transmit modulated signals. Receiver sensor electrodes may be held substantially constant relative to the reference voltage to facilitate receipt of resulting signals. A resulting signal may comprise effect(s) corresponding to one or more modulated signals, and/or to one or more sources of environmental interference (e.g. other electromagnetic signals). Sensor electrodes 120 may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) 124 of the input device 100. In other embodiments, components of processing system 110 are physically separate with one or more components close to sensing element(s) 124 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc. In one or more embodiments, a grid electrode may be disposed between two or more sensor electrodes 120 and processing system 110 may be configured to drive the guard electrode with a guarding signal which may be configured to guard the sensor electrodes. In one embodiment, the guarding signal may be a shielding signal that is configured to guard and shield the sensor electrodes. The grid electrode may be disposed on the same layer as the sensor electrode and comprise one or more common electrodes. In other embodiments, the grid electrode may be disposed on a layer separate from the sensor electrodes. In one embodiment, a first grid electrode may be disposed on a first layer common with the sensor electrode a second grid electrode may be disposed on a second layer that is between the sensor electrodes and an input surface of the input device 100. In one embodiment, the grid electrode may be segmented into multiple segments that may be driven individually by the processing system 110. In one embodiment a first grid electrode is disposed such that it at least partially circumscribes a first subset of sensor electrodes and a second grid electrode is disposed such that it is at least partially circumscribes a second subset of sensor electrodes. In other embodiments, the input device 100 may comprise more than two grid electrodes. In various embodiments, the grid electrode may be referred to as grid electrode. The grid electrode(s) and the sensor electrode may encompass the entire surface of the Vcom electrode, where the Vcom electrode is an electrode common to one or more display pixels.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) 124 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) 124 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing elements 124. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensing elements 124 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
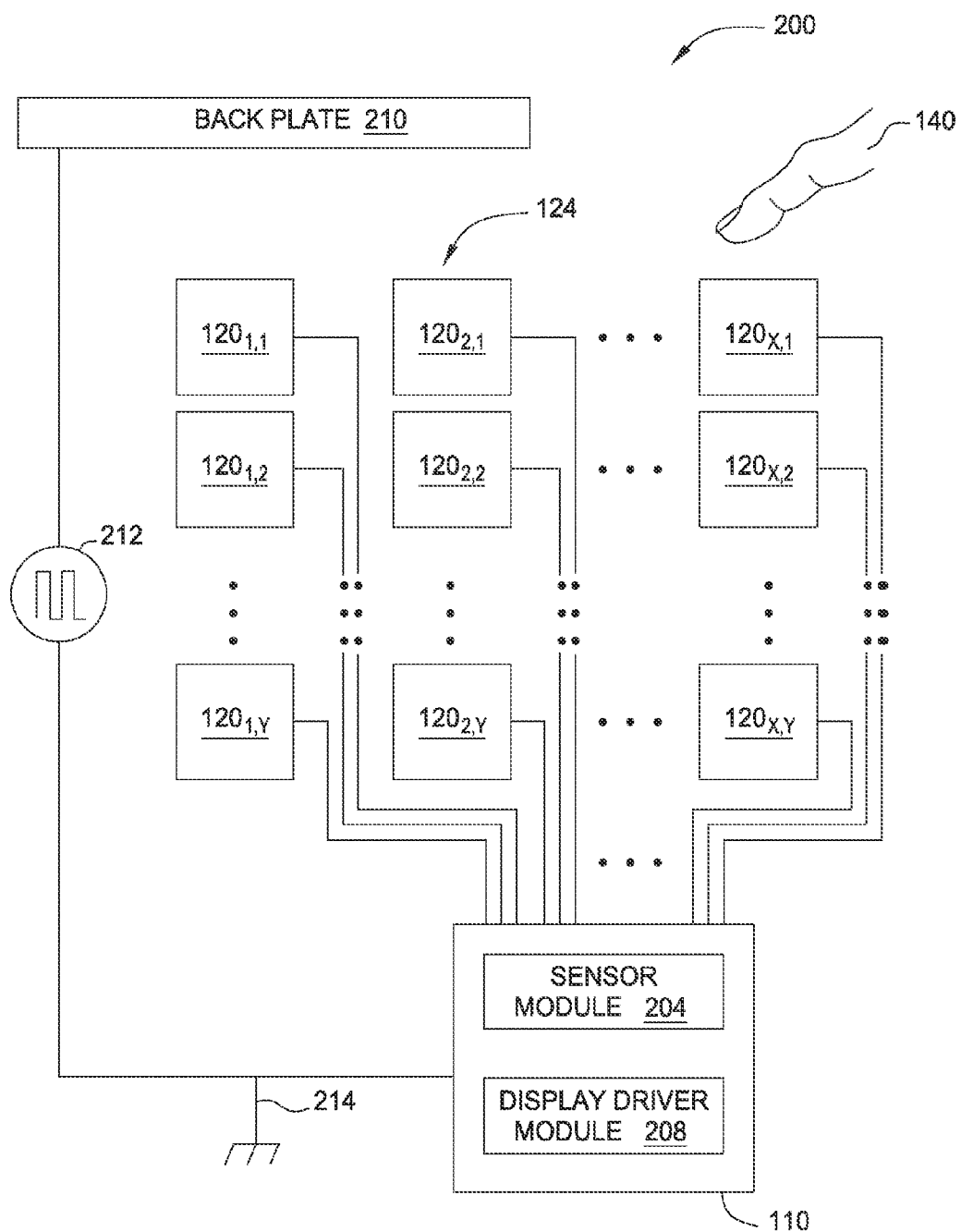
FIG. 2 illustrates a simplified exemplary array of sensor elements that may be used in the input device of FIG. 1.

FIG. 2 shows a portion of an exemplary pattern 200 of sensing elements 124 configured to sense in the sensing region 170 associated with the pattern, according to some embodiments. For clarity of illustration and description, FIG. 2 shows the sensor electrodes 120 of the sensing elements 124 in a pattern of simple rectangles, and does not show various other components. The exemplary pattern 200 of sensing elements 124 comprises an array of sensor electrodes $120_{X,Y}$ (referred collectively as sensor electrodes 120) arranged in X columns and Y rows, wherein X and Y are positive integers. It is contemplated that the pattern of sensing elements 124 comprises a plurality of sensor electrodes 120 having other configurations, such as polar arrays, repeating patterns, non-repeating patterns, a single row or column, or other suitable arrangement.

The sensor electrodes 120 may be formed as discrete geometric forms, polygons, bars, pads, lines or other shape, which are ohmically isolated from one another. In various embodiments, one or more sensor electrodes comprise a different shape. Further, in some embodiments, at least two sensor electrodes may be interdigitated with each other. In other embodiments, the sensor electrodes have at least one of a non-concave portion, concave portion, convex portion, non-convex portion, or any combination thereof. The sensor electrodes 120 may be electrically coupled through circuitry to form electrodes having larger plan area relative to a discrete one of the sensor electrodes 120. The sensor electrodes 120 may be fabricated from opaque or non-opaque conductive materials. In embodiments wherein the sensor electrodes 120 are utilized with a display device, it may be desirable to utilize non-opaque conductive materials for the sensor electrodes 120. In embodiments wherein the sensor electrodes 120 are not utilized with a display device, it may be desirable to utilize opaque conductive materials having lower resistivity for the sensor electrodes 120 to improve sensor performance. Materials suitable for fabricating the sensor electrodes 120 include ITO, aluminum, silver, copper, and conductive carbon materials, among others. The sensor electrodes 120 may be formed as contiguous body of conductive material having little or no open area (i.e., having a planar surface uninterrupted by holes), or may alternatively be fabricated to form a body of material having openings formed therethrough. For example, the sensor electrodes 120 may be formed a mesh of conductive material, such as a plurality of interconnected thin metal wires. In one embodiment, at least one of the length and width of the sensor electrodes 120 may be in a range of about 1 to about 2 mm. In other embodiments, at least one of the length and width of the sensor electrodes may be less than about 1 mm or greater than about 2 mm. In other embodiment, the length and width may not be similar, and one of the length and width may be in the range of about 1 to about 2 mm. Further, on various embodiments, the sensor electrodes 120 may comprise a center to center pitch in the range of about 4 to about 5 mm; however, in other embodiments, the pitch may be less than about 4 mm or greater than about 5 mm.

The sensor electrodes 120 are typically ohmically isolated from each other. That is, one or more insulators separate the sensor electrodes 120 and prevent them from electrically shorting to each other. In some embodiments, the sensor electrodes 120 are separated by an insulative gap. The insulative gap separating the sensor electrodes 120 may be filled with an electrically insulating material, or may be an air gap. The sensor electrodes 120 are coupled to the processing system 110 and utilized to determine the presence (or lack thereof) of an input object 140 in the sensing region 170. Multiple sensor electrodes 120 may be coupled to the processing system 110 at any one time. In some embodiments, switching elements such as multiplexers may be utilized to selectively couple sensor electrodes 120 to the processing system 110. Switching elements may be configured to couple a first set of sensor electrodes 120 and then to couple a second set of sensor electrodes 120 to the processing system 110. These switching elements may be external to or internal to the processing system 110.

Modulation source 212 is coupled to system ground 214 of the input device 100 and to back plate 210 of the input device 100. The system ground 214 is a common reference voltage for electrical components within input device 100, as is generally known. The back plate 210 is a conductive body proximate to the input device 100, as is generally known. The back plate 210 is ohmically separate from the electrical components of the input device 100, but capacitively coupled to the electrical components of the input device 100. In some embodiments, the modulation source 212 is included in the processing system 110, while in other embodiments, the modulation source 212 is not included in the processing system 110.

In one mode of operation (the "back plate modulation mode"), to detect the presence of an input object 140 in the sensing region 170, the processing system 110 is configured to cause modulation source 212 to apply a modulation signal between system ground 214 and back plate 210. The modulation signal induces an electrical current through capacitive couplings between the back plate 210, the input object 140, and one or more sensor electrodes 120, which causes resulting signals to be generated in sensor electrodes 120 that are proximate to the input object 140. More specifically, the modulation signal applied by modulation source 212 creates an electrical circuit with the input object 140. This circuit includes the modulation source 212 coupled in series to the back plate 210, which is capacitively coupled to an input object 140 such as a human body, which is capacitively coupled to a sensor electrode 120 of the input device 100, which is coupled to the system ground 214 through the electrical components of the input device 100. Through this circuit, the modulation signal causes the voltage on the back plate 210 and the input object 140 to be modulated with respect to the system ground 214 and the sensor electrode 120. The current flow through this circuit induces effects in the sensor electrode 120, which can be detected by the processing system 110 as resulting signals.

The modulated signal applied by the modulation source 212 is generally a modulated signal containing one or more bursts over a period of time allocated for input sensing. The modulated signal may have an amplitude, frequency and voltage which may be changed to obtain more robust location information of the input object in the sensing region 170. In some embodiments, the modulation applied by the modulation source 212 is a square wave. In other embodiments, the modulation applied by the modulation source 212 is a sine wave having a frequency of between 100 kHz and 500 kHz. In yet other embodiments, other waveforms and/or frequencies may be applied.

Areas of localized capacitive coupling may be termed "capacitive pixels." Capacitive pixels may be formed between an individual sensor electrode 120 and an input object 140 when the back plate 210 is modulated for input sensing. The capacitive coupling changes with the proximity and motion of input objects 140 in the sensing region 170, and thus may be used as an indicator of the presence of the input object in the sensing region of the input device 100.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region 170.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

The processing system 110 coupled to the sensing electrodes 120 includes a sensor module 204, a determination module (not shown), and optionally, a display driver module 208, in embodiments of the input device 100 that include display elements. The sensor module 204 includes sensor circuitry configured to drive a modulated signal onto the back plate 210, via modulation source 212.

Sensor module 204 is further configured to receive resulting signals with one or more sensor electrodes 120 when the back plate 210 is driven with modulated signals. The resulting signals comprise effects corresponding to the modulated signals. When configured to receive resulting signals, the sensor electrodes 120 are said to be configured as "receiver sensor electrodes." The sensor module 204 may determine a position of the input object 140 in the sensing region 170 or may provide a signal including information indicative of the resulting signal to another module or processor, for example, a determination module (not depicted in FIG. 2) or a processor of the electronic system 150 (i.e., a host processor), for determining the position of the input object 140 in the sensing region 170. The sensor electrodes 120 configured as receiver sensor electrodes may be operated singly or multiply to acquire resulting signals. The resulting signals may be used to determine measurements of the capacitive couplings at the capacitive pixels.

The determination module is configured to analyze the resulting signals to determine information such as the position of an input object 140 in the sensing region 170. In one embodiment, positional information of the input object 140 may be determined based on the magnitude of the resulting signals and the sensor electrode 120 with which the resulting signals are detected; however, in other embodiments, the positional information may be based on alternative or additional factors.

The display driver module 208 is configured to update pixel elements in embodiments of the input device 100 that include a display. The display driver module 208 may be included in or separate from the processing system 110. The display driver module 208 includes circuitry configured to provide display image update information to the display of the display device 160 during non-sensing (e.g., display updating) periods or during sensing periods.

In one embodiment, the electrodes 120 are disposed in a matrix array where each sensor electrode 120 is substantially the same size and/or shape. In such embodiment, the sensor electrodes 120 may be referred to as a matrix sensor electrode. In one embodiment, one or more of sensor electrodes of the matrix array of sensor electrodes 120 may vary in at least one of size and shape. Each sensor electrode of the matrix array may correspond to a pixel of the capacitive image.

In various embodiments, input device 100 may comprise display device 160 (depicted in FIG. 1) having an integrated input sensing device. In such embodiments, one or more of the sensor electrodes 120 comprise one or more display electrodes used in updating the display of the display screen. In one or more embodiments, the display electrodes comprise one or more segments of a $V_{COM}$ electrode (common electrode(s)), a source drive line ("source driver electrode"), gate line ("gate electrode"), an anode electrode or cathode electrode, or any other display element. These common electrodes may be disposed on an appropriate display screen substrate. For example, the common electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the common electrode can also be referred to as a "combination electrode", since it performs multiple functions. In various embodiments, each of the sensor electrodes 120 comprises one or more common electrodes. In other embodiments, at least two sensor electrodes 120 may share at least one common electrode.

In one or more embodiments, capacitive sensing (or input sensing) and display updating may occur during at least partially overlapping periods. For example, as a common electrode is driven for display updating, the common electrode may also be operated for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as one display update period. In various embodiments, the non-display update period may be longer than an integer number of display line update periods. In such embodiment, the non-display update period may be referred to as a long horizontal blanking period, long h-blanking period or a distributed blanking period. In other embodiments, the non-display update period may comprise horizontal blanking periods and vertical blanking periods. In one embodiments, the non-display update period is shorter than a display line update period but longer than a traditional horizontal blanking period. Processing system 110 may be configured to operate sensor electrodes 120 for capacitive sensing during any one or more of or any combination of the different non-display update periods, or during a display update period.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be independent (i.e., any fraction or integer) of the display frame rate.

In addition to modulating the back plate 210 with respect to system ground 214 in order to determine the presence of an input object 140, the processing system 110 may also operate the sensor electrodes 120 in various additional modes of operation to determine the presence of an input object 140.

In a first additional mode of operation, the arrangement of sensor electrodes 120 may be utilized to detect the presence of an input object via absolute sensing techniques. That is, processing system 110 is configured to drive each sensor electrode 120 with a signal and receive a resulting signal comprising effects corresponding to the modulated signal, which is utilized by the processing system 110 or other processor to determine the position of the input object. In one embodiment each of the sensor electrodes 120 are simultaneously driven and received with, obtaining an absolute capacitive measurement simultaneously from each of the sensor electrodes 120. In various embodiments, processing system 110 may configured to selectively drive and receive with a portion of sensor electrodes 120. For example, the sensor electrodes may be selected based on, but not limited to, an application running on the host processor, a status of the input device, and an operating mode of the sensing device. In another embodiment, the sensor electrodes may be operated such that more than one sensor electrodes is driven and received with at a time, or sensor electrodes are driven and received with at the same time. In such embodiments, an absolute capacitive measurement may be obtained from each of the one or more sensor electrodes 120 simultaneously.

In a second additional mode of operation, the sensor electrodes 120 may be utilized to detect the presence of an input object via profile sensing techniques. That is, processing system 110 is configured drive the sensor electrodes 120 row-by-row and then column-by-column, with modulated signals. The signals generated in response to driving the sensor electrodes 120 in this configuration provide information related to the position of an input object 140 within the sensing region.

In a third additional mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a modulated signal and receive resulting signals with the second group of sensor electrodes 120, where each resulting signal comprises effects corresponding to the modulated signal. The resulting signal is utilized by the processing system 110 or other processor to determine the position of the input object. The sensor module 204 may be selectively coupled to one or more of the sensor electrodes 120. For example, the sensor module 204 may be coupled to selected portions of the sensor electrodes 120. In another example, the sensor module 204 may be coupled to a different portion of the sensor electrodes 120. In yet another example, the sensor module 204 may be coupled to all the sensor electrodes 120 and operate in either an absolute or transcapacitive sensing mode. Transmitters may be operated such that one transmitter electrode transmits at one time, or multiple transmitter electrodes transmit at the same time. Where multiple transmitter electrodes transmit simultaneously, the multiple transmitter electrodes may transmit the same modulated signal and effectively produce an effectively larger transmitter electrode. Alternatively, the multiple transmitter electrodes may transmit different modulated signals. For example, multiple transmitter electrodes may transmit different modulated signals according to one or more coding schemes that enable their combined effects on the resulting signals to be independently determined.

The input device 100 may be configured to operate in any one of the additional modes of operation described above. The input device 100 may also be configured to switch between any two or more of the modes described above, including the back plate modulation mode, and the first, second, and third additional modes of operation. For example, the input device 100 may be operated in the back plate modulation mode in order to sense that an input object 140 is present in the sensing region 170, and then switched to the third additional mode so that the input object 140 may be tracked in a particular region of the input device 100.

The back plate modulation mode provides a reduction in effects related to parasitic capacitance. More specifically, in some modes of operation, sensor electrodes 120 are driven with modulated signals for touch sensing. In such modes of operation, the sensor electrodes 120 may experience effects related to parasitic capacitance due to capacitive coupling between the sensor electrodes 120 and other nearby conductive components such as other sensor electrodes 120, as well as traces and other electrodes. In some situations, this parasitic capacitance can cause the dynamic range of the receiver circuit to be exceeded, reducing the ability to accurately detect the presence of an input object through the use of capacitive sensing techniques. More specifically, the proportion of a resulting signal that comprises effects related to parasitic capacitance, as opposed to the presence of input objects, increases. This proportional increase makes determining the presence of an input object 140 more difficult. Some example parasitic capacitances are now discussed with respect to FIGS. 3 and 4.

Figure 3:
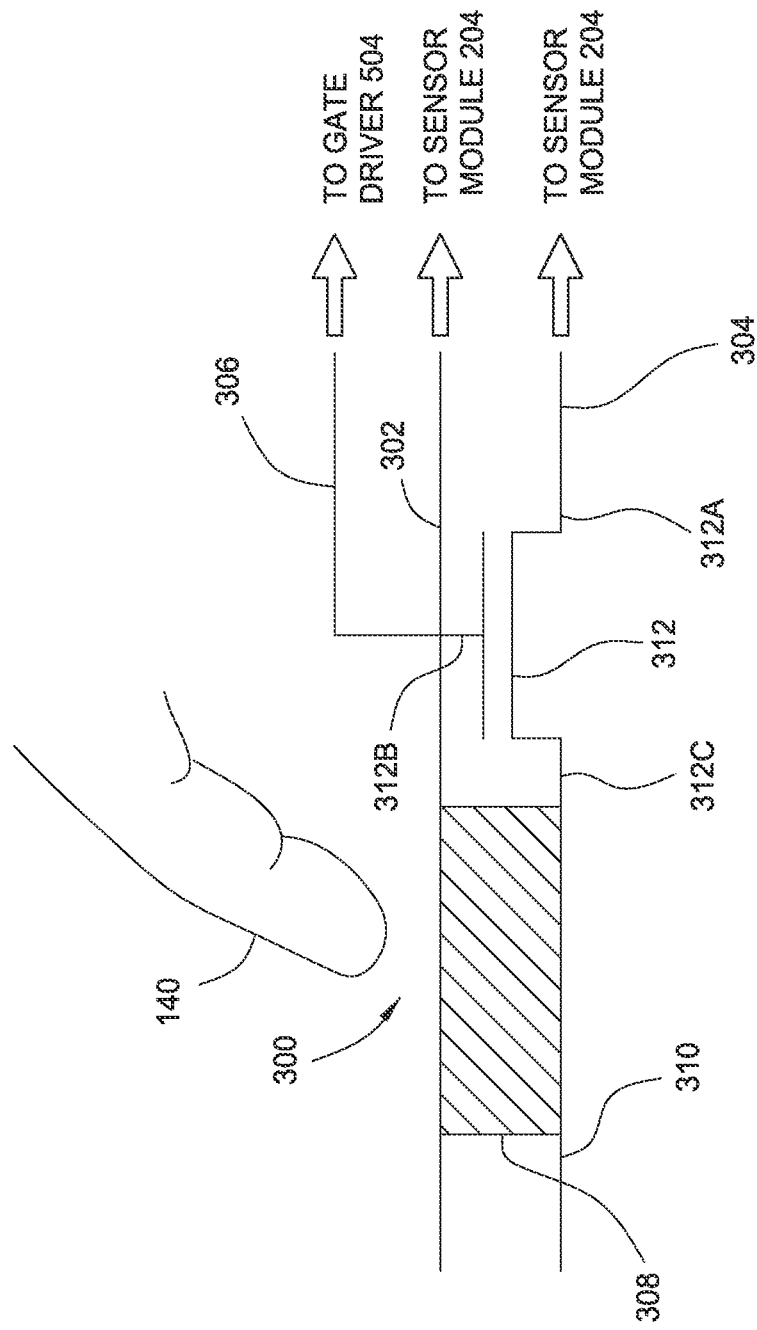
FIG. 3 is a cross-sectional partial schematic view of a liquid crystal display cell.

FIG. 3 is a cross-sectional partial schematic view of a display cell 300. For illustration, the display cell 300 is described with reference to liquid crystal display technology. However, the invention is applicable to other display technologies. The display cell 300 includes a common voltage layer ($V_{COM}$ layer) 302, a source line (also referred to herein as a "source driver electrode" or "source electrode") 304, a gate line (also referred to herein as a "gate driver electrode" or "gate electrode") 306, liquid crystal material 308, a pixel electrode 310, and a pixel transistor 312 having a source 312a, a gate 312b, and a drain 312c.

The $V_{COM}$ layer 302 forms one electrode of a capacitor that includes liquid crystal material 308 as the dielectric. A pixel electrode 310 forms the opposite electrode of the capacitor. Applying a voltage across liquid crystal material 308 causes the liquid crystal material 308 to change optical properties, which alters the polarization of the light that flows through the liquid crystal material 308. A polarization filter passes more or less light based on the polarization of the light. In this way, light intensity is adjusted by adjusting the voltage applied to the liquid crystal material 308. Updating pixel values is thus generally accomplished by setting the pixel electrode 310 to a certain voltage with respect to the $V_{COM}$ layer 302.

Figure 4:
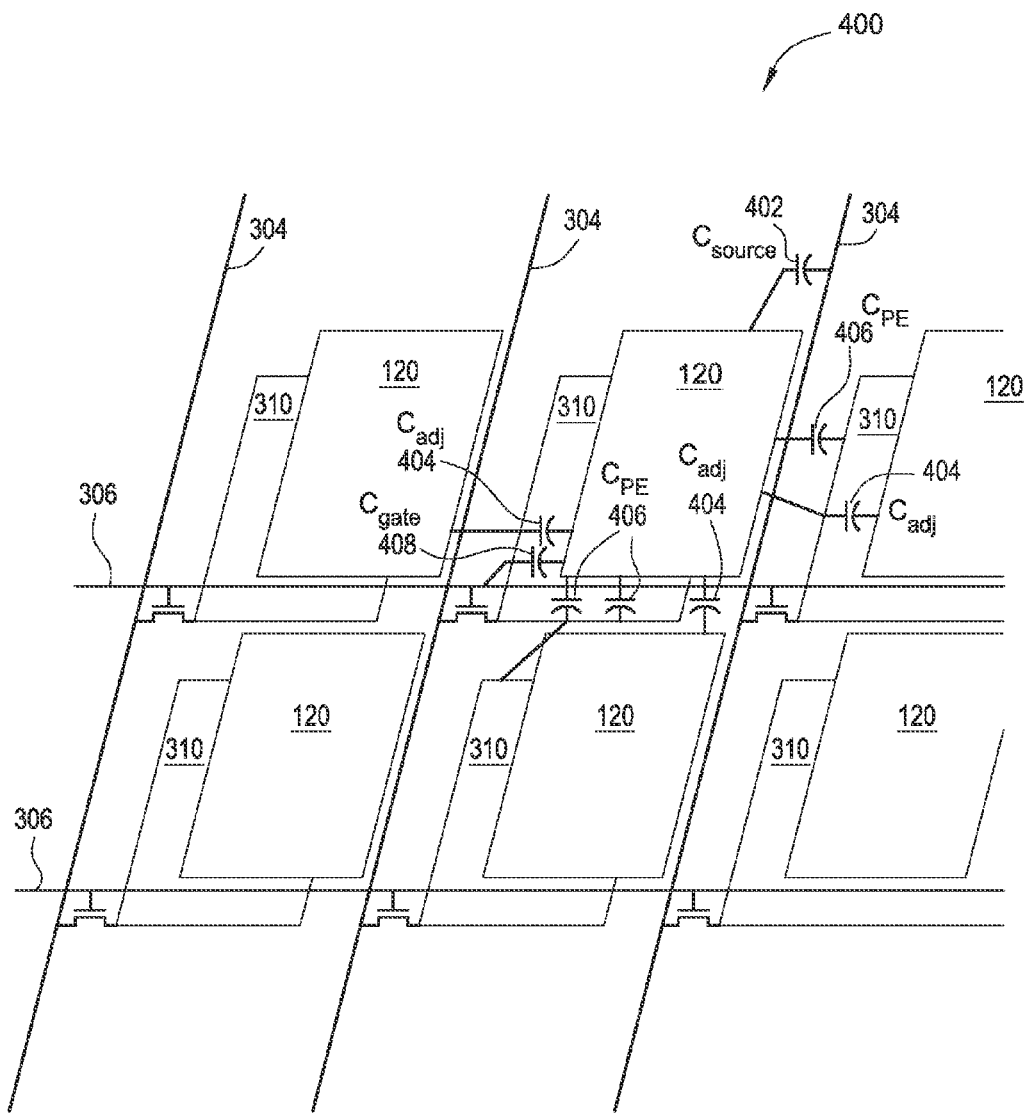
FIG. 4 is an isometric schematic view of a display device integrated with an input device, illustrating potential sources of parasitic capacitance.

FIG. 4 illustrates a plurality of potential parasitic capacitance sources for sensor electrode 120 in an example embodiment of an input device 400 that includes both touch sensing components and display components. In the illustrated embodiment 400, $C_{source}$ 402 represents the parasitic capacitance between the sensor electrode 120 and a source line 304, $C_{adj}$ 404 represents the parasitic capacitance between the sensor electrode 120 and adjacent (or proximate) sensor electrodes 120, $C_{pe}$ 406 represents the parasitic capacitance between the sensor electrode 120 and a pixel electrode 310 and $C_{gate}$ 408 represents the parasitic capacitance between the sensor electrode 120 and a gate line 306. The parasitic capacitances illustrated in FIG. 4 may be a subset of a larger number of parasitic capacitances. Further, in various embodiments, there may be parasitic capacitive couplings between the sensor electrode 120 and multiple gate lines 306, source lines 304, adjacent sensor electrodes 120 and/or pixel electrodes 310.

Referring back to FIG. 2, by modulating the back plate 210 with respect to system ground 214, the sensor electrodes 120 do not need to be directly modulated with respect to the system ground 214. Instead, the sensor electrodes 120 may be operated by maintaining the sensor electrodes 120 at a constant voltage with respect to the system ground. Because the sensor electrodes 120 do not need to be directly modulated, parasitic capacitances between the sensor electrodes 120 and other components of the input device 100 are reduced.

Another benefit of modulating the back plate 210 with respect to system ground 214 in input device 100 is realized in embodiments of the input device 100 that include display elements. With many traditional touch/display embodiments, touch sensing is conducted at a time in which pixels in the display are not being updated. Embodiments of the present invention comprising an input device 100 integrated with a display device benefit from modulating the back plate with respect to system ground because such modulation helps to facilitate a touch and display timing scheme in which touch sensing and display updating are performed during overlapping time periods. This overlapping timing scheme is also referred to as "overlap timing" herein. Example embodiments of an input device that includes display elements are now discussed in greater detail with respect to FIGS. 5A-6.

Figure 5A:
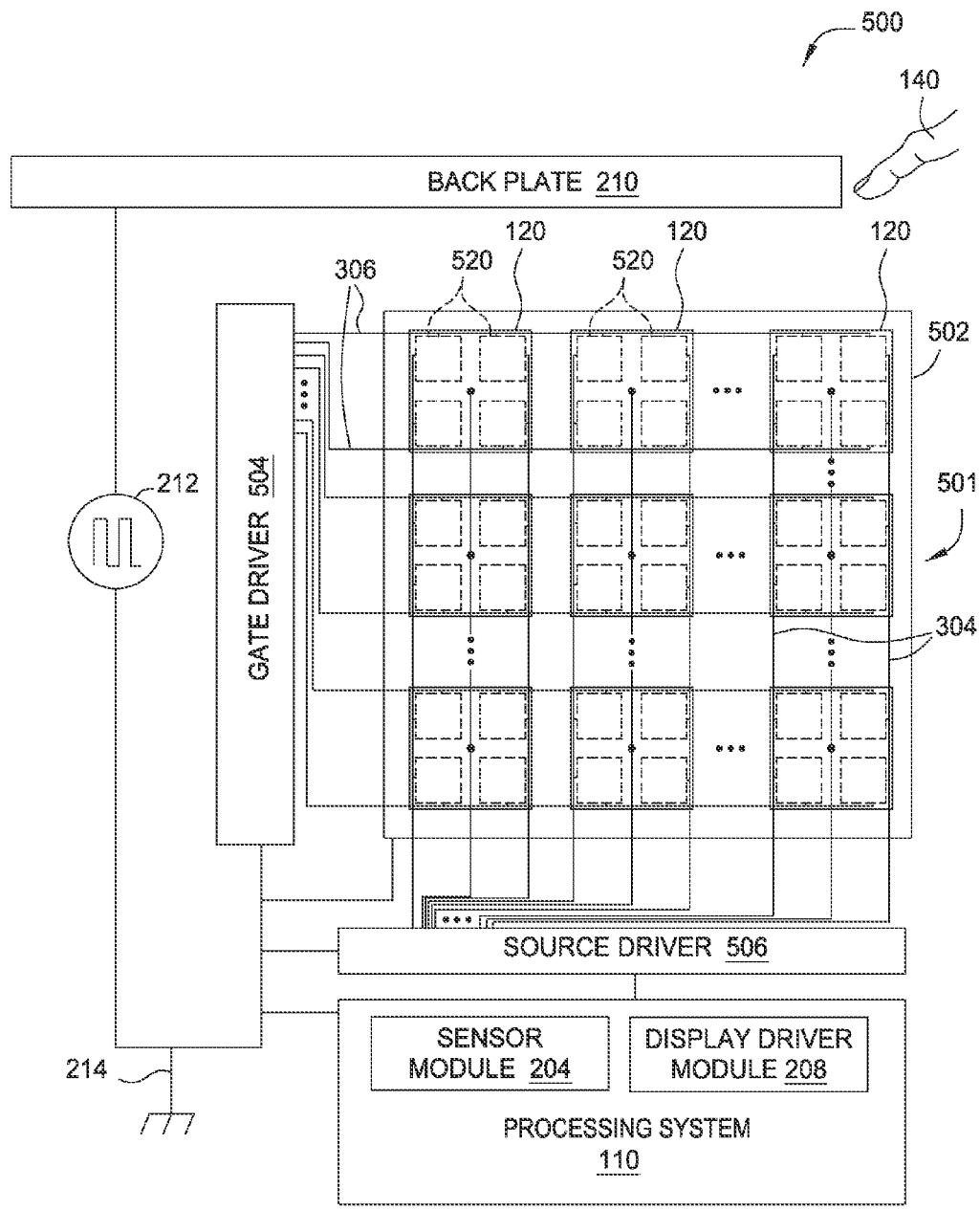
FIG. 5A is a schematic diagram of an example display device integrated with an input device.

FIG. 5A illustrates a schematic diagram of an example display device 500 integrated with an input device. As shown, the display device 500 includes display unit 501, which includes display module 502, gate driver 504, and processing system 110. Display device 500 also includes modulation source 212, system ground 214, and back plate 210. The display device 500 also includes a backlight and other components that are not shown.

The processing system 110 includes circuitry for performing display updating, for performing capacitive sensing, and for processing signals received as a result of capacitive sensing operations. Processing system 110 includes various modules, such as sensor module 204, determination module (not shown), source driver 506, and display driver module 208. In one embodiment, sensor module 204, determination module, source driver 506, and display driver module 208 all are disposed within a common integrated controller. In other embodiments, processing system 110 may comprise multiple integrated controllers and sensor module 204, determination module, source driver 506, and display driver module 208 be embodied within at least one of the integrated controllers. For example, the sensor module 204 and determination module may be embodied in a first integrated controller and source driver 506 may be embodied in a second integrated controller. In another example, the sensor module 204 and source driver 506 may be embodied within a common controller while at least one of the determination module and display driver module 208 be embodied within a separate controller. In yet other embodiments, processing system 110 comprises multiple integrated controllers and portions of one or more modules may be embodied in two or more integrated controllers. For example, the sensor module 204 transmitters may be embodied within a first integrated controller and the sensor module 204 receivers and source drivers 506 may be embodied within a second integrated controller.

The display module 502 includes sensor electrodes 120 that comprise common voltage ($V_{COM}$) electrodes. The display module 502 also includes sub-pixel elements 520. The sub-pixel elements 520 include components for displaying colors in sub-pixels.

The gate driver 504 and source driver 506 generate signals to drive each of the sub-pixel elements 520 for display. The gate driver 504 selects a row of sub-pixel elements 520 by providing a gate voltage to a particular row of sub-pixel elements 520. The source driver 506 provides source signals to the sub-pixel elements 520 that are to be updated. The source signals are voltage levels chosen to apply a particular voltage differential across liquid crystal material 308 in order to cause liquid crystal material 308 to transmit the desired amount of light from the backlight. The source signals may be different voltage levels for each sub-pixel.

The sensor module 204 includes sensor circuitry configured to cause modulation source 212 to modulate back plate 210 with respect to system ground 214 during periods in which input sensing is desired. The sensor module 204 may also comprise one or more transmitters configured to drive sensor electrodes 120 with signals when the display device 500 is operated in one of the first, second, or third additional modes of operation described above with respect to FIG. 2. In one or more embodiments the sensor module 204 comprises one or more receivers configured to receive resulting signals with the sensor electrodes 120.

In one embodiment, the source driver 506 and receivers of sensor module 204 may be embodied as a single integrated controller configured for both capacitive sensing and display functionality. In other embodiments, the source driver 506 and transmitters of sensor module 204 may be embodied as a single integrated controller configured for both capacitive sensing and display functionality. In yet other embodiments, the source driver 506 and transmitters and receivers of sensor module 204 may be embodied as a single integrated controller configured for both capacitive sensing and display functionality.

In some embodiments, the source driver 506 comprising receivers of sensor module 204 includes multiple receiver channels that are each configured to measure the change in capacitance between one or more sensor electrodes 120 and an input object 140. In one embodiment, measuring the change in capacitance comprises modulating the back plate 210 and holding a sensor electrode 120 at a particular voltage with respect to system ground 214 while measuring an amount of current required to hold the sensor electrodes 120 at that voltage. An example of a receiver channel is circuit 600 depicted and described with respect to FIG. 6. Each of the receiver channels may be selectively coupled to one or more sensor electrodes 120 with selection circuitry such as one or more multiplexers. In one or more embodiments, a receiver channel may comprise an analog front end. Further, in other embodiments, other receiver channels incorporated with the source driver 506 may comprise digital, analog elements or any combination of digital or analog elements.

The determination module includes determination circuitry configured to process signals received from sensor module 204. In some embodiments, the determination module is configured to determine changes in capacitive coupling between the sensor electrodes 120 and input object 140. The determination module may be selectively coupled to each of the receiver channels in sensor module 204.

The display driver module 208 may be included in or separate from the processing system 110. The display driver module 208 includes circuitry configured to provide display image update information to pixel elements 520. More specifically, the display driver module 208 includes circuitry for controlling gate driver 504 and source driver 506 to update pixel elements 520 to specified values.

As described above, in various embodiments, the processing system 110 is configured to drive source driver electrodes (such as electrodes coupled to sources of pixel transistors), gate driver electrodes (such as electrodes coupled to gates of pixel transistors), if the gate driver is part of processing system 110, and sensor electrodes 120 during time periods that at least partially overlap. In one example, sensor module 204 is configured to drive modulation source 212 with modulated signals during a first period in order to determine changes in capacitive coupling between a sensor electrode 120 and an input object 140. Further, the gate driver 504 is configured to drive a first gate electrode with a second signal during a second period. Source driver 506 is also configured to drive a first source driver electrode with a third signal during a third period. In some embodiments, the first period, the second period, and the third period at least partially overlap. In other embodiments, the first period does not overlap with the second period and the third period.

In instances in which display device 500 is coupled to earth ground, a modulation filter may be utilized to prevent the modulation path between the system ground 214 and the back plate 210 from being shorted out. Such a filter is discussed with respect to FIG. 5B.

Figure 5B:
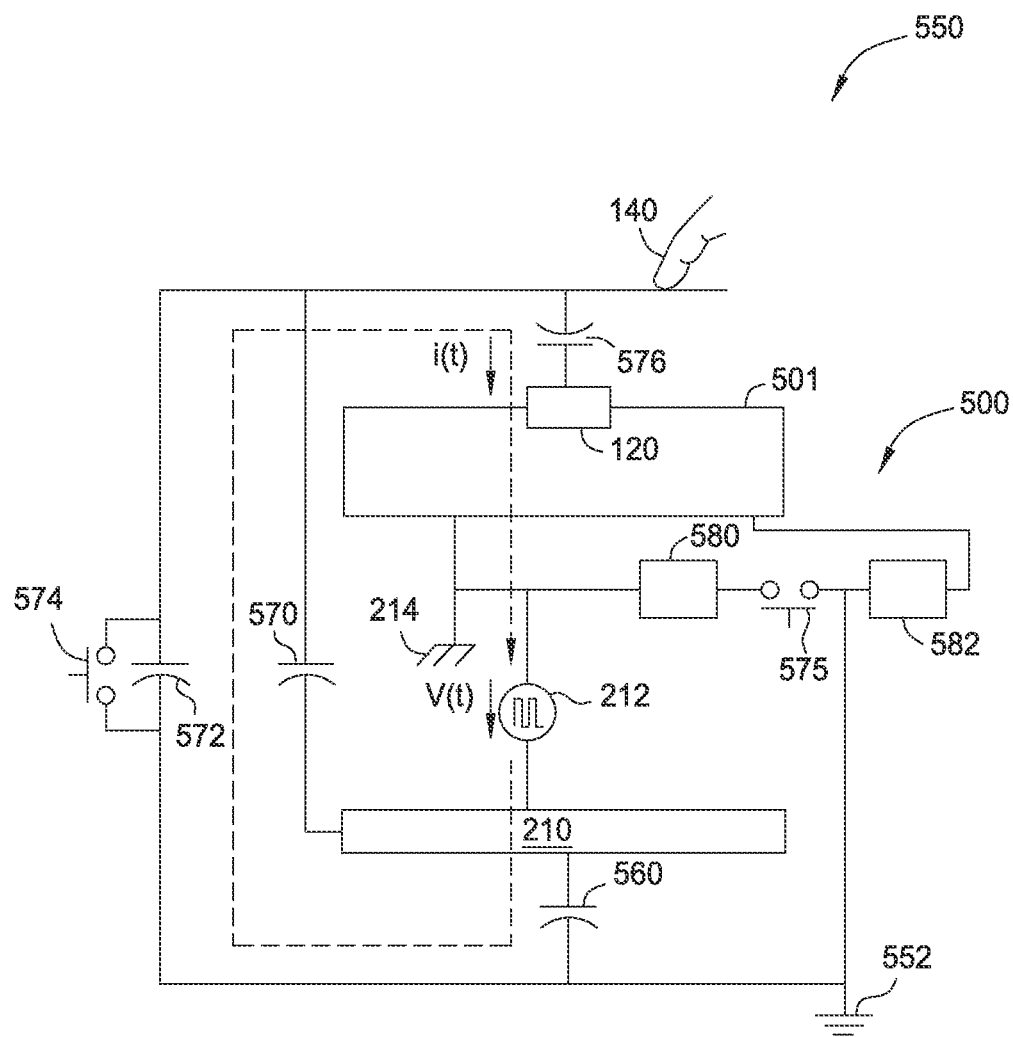
FIG. 5B is a schematic illustration of the display device with integrated touch sensing device.

FIG. 5B is a schematic illustration of the display device 500 with integrated touch sensing device illustrated in FIG. 5A. Display unit 501 includes sensor electrode 120 as well as other parts not specifically shown but described above. Display unit 501 includes multiple sensor electrodes 120 but only one is shown. Modulation source 212 applies a modulation signal between system ground 214 and back plate 210. The back plate 210 is capacitively coupled to earth ground 552 through back plate-to-earth ground capacitance 560. The back plate 210 is also capacitively coupled to an input object 140 (for example, through a human body that may be proximate to the display device 500 and of course directly coupled to a finger) through back plate-to-input object capacitance 570. The modulation applied by modulation source 212 induces current flow through two circuits—one that includes the back plate-to-input object capacitance 570, and one that includes back plate-to-earth ground capacitance 560 and earth ground-to-input object capacitance 572. This induced current flow is experienced by sensor electrode 120, which forms a part of these two circuits. Thus, modulation source 212 applies a signal that can be detected by sensor electrode 120.

Two events may occur that alter the contour of these two circuits. In a first event, the input object 140 is ohmically coupled to earth ground 552 (for example, when a person touches a grounded object such as a metal pipe). In such an instance, the input object-to-earth ground capacitance 572 is nullified (illustrated as the "switch" 574 being closed). However, the back plate-to-input object capacitance 570 still exists, and the modulation source 212 is still able to apply a voltage differential between system ground 214 and the back plate 210. Thus, the sensor electrode 120 still experiences a current flow.

In a second event, the display device 500 is coupled to earth ground 552, through a device connector 582 (illustrated as the "switch" 575 being closed). The device connector 582 may be one of a variety of connectors, such as a universal serial bus (USB) connector, a power connector, or other similar types of connectors. When such an event happens, system ground 214 is ohmically coupled to earth ground 552. Thus, the modulation voltage applied by modulation source 212 is effectively shorted out. If the input object 140 is also directly coupled to earth ground 552, then the input object 140 is directly shorted to the system ground 214 and no voltage differential exists between the input object 140 and the system ground 214. To address this concern, a blocking filter 580 is provided between system ground 214 and the device connector 582. The blocking filter 580 serves to block electrical signals having a frequency that is similar to the frequency applied by the modulation source 212. Examples of circuitry with such capability are an inductor with an appropriate inductance value and a band-pass filter configured to pass a desired frequency (for example, a frequency of signals used by the device connector 582 such as USB data signals and the like) and block signals having the modulation frequency.

Figure 6:
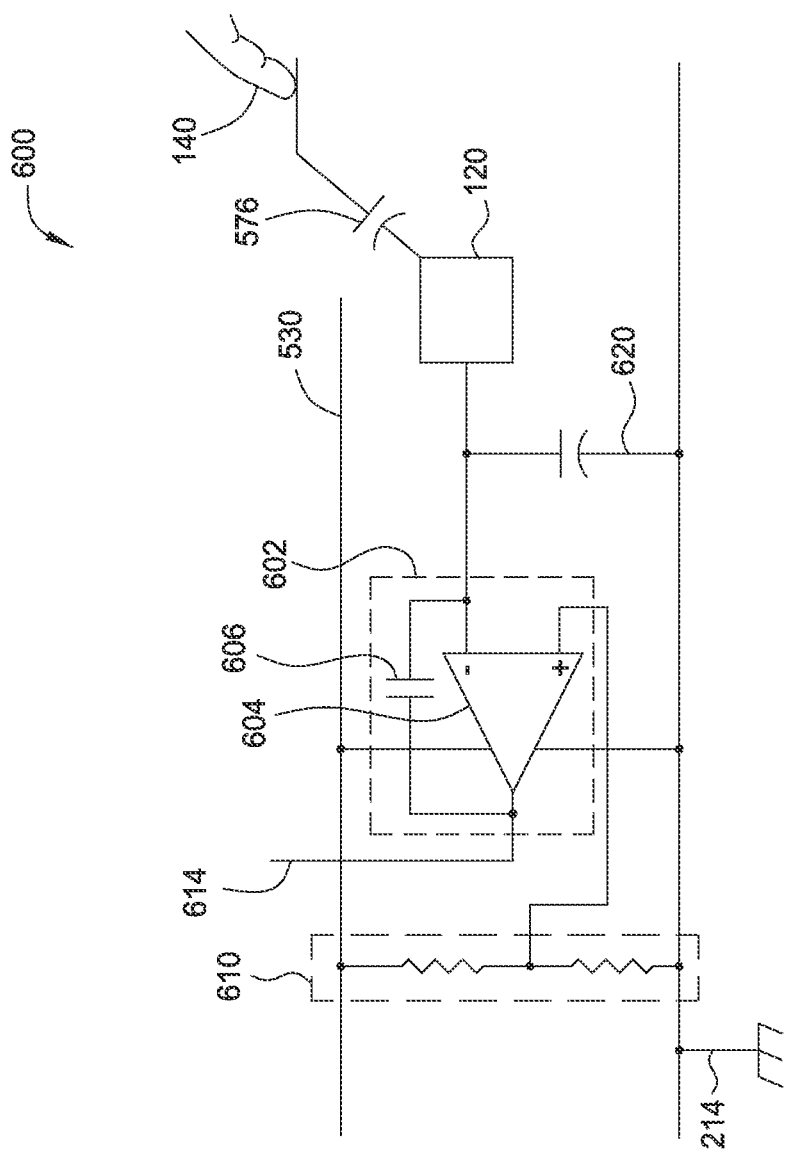
FIG. 6 illustrates an example circuit for receiving resulting signals with receiver channels.

FIG. 6 illustrates an example circuit 600 for receiving resulting signals with receiver channels when an input device such as input device 100 or display device 500 is operated in a back plate modulation mode. As shown, the circuit 600 includes a charge accumulator 602, a voltage divider 610, a sensor electrode 120, and system ground 214.

The charge accumulator 602 includes an operational amplifier 604 with capacitive feedback 606 between the inverting input and the output of the operational amplifier. The output of the operational amplifier 604 is coupled to an output node 614. The inverting input of the operational amplifier 604 is capacitively coupled to the output node 614, and is ohmically coupled to sensor electrode 120, which is capacitively coupled to an input object 140 when present in sensing region 170 and near the sensor electrode 120. The non-inverting input is coupled to a reference voltage. In one embodiment, the reference voltage is the output of voltage divider 610, which maintains the reference voltage at a fixed voltage between the voltage of system ground and power supply voltage. The positive voltage power supply terminal and negative voltage power supply terminals of the operational amplifier are coupled to a power supply line 530 and system ground 214, respectively.

The charge accumulator 602 operates to maintain the sensor electrode 120 at a constant voltage with respect to the system ground 214. When an input object 140 is brought into the sensing region 170 near the sensor electrode 120, the amount of current that the operational amplifier is required to flow in order to cause the voltage of the sensor electrode 120 to remain constant with respect to system ground changes as compared with a state in which no input object 140 is present in the sensing region 170. This amount of current flow is thus indicative of capacitive coupling between the sensor electrode 120 and the input object 140 and is reflected in the output of the operational amplifier.

The output node 614 of the charge accumulator 602 may be coupled to various supporting components such as demodulator circuitry, a low pass filter, sample and hold circuitry, other useful electronic components, such as filters and analog-to-digital converters (ADCs) or the like. These supporting components function to take measurements from the charge accumulator 602 related to the capacitive coupling, or lack thereof, of the sensor electrode 120 to an input object 140.

Parasitic capacitance 620 is not a discrete element, but instead represents an amount of capacitance between the sensor electrode 120 and other components in input device 100. Modulating the back plate 210 with respect to system ground 214 reduces the amount of parasitic capacitance as compared with an input device that does not include a modulated back plate 210. More specifically, modulating the back plate 210 with respect to system ground couples current through input object 140, then through capacitance 576, into electrode 120. Because charge accumulator circuit 602 holds sensor electrode 120 at a constant voltage, no modulated current flows through parasitic capacitance 620. Therefore, any deleterious effects of capacitance 620 are nullified.

CONCLUSION

Various embodiments of the present technology provide input devices and methods for reducing parasitic capacitance in a capacitive sensing input device. Particularly, embodiments described herein advantageously utilize a modulated back plate to drive modulated signals to sensor electrodes in an input device to reduce the parasitic capacitances experienced by sensor electrodes in the input device. Additionally, some other embodiments provide a display device with touch sensing capabilities that includes a modulated back plate to drive modulated signals to sensor electrodes in an input device to reduce the parasitic capacitances experienced by sensor electrodes in the input device.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What is claimed is:

1. An input device comprising a display device having an integrated capacitive sensing device, the input device comprising;
    a system ground;
    a conductive back plate configured to be coupled to an input object;
    a plurality of display elements;
    a plurality of sensor electrodes; and
    a processing system coupled to the conductive back plate, to the plurality of display elements, and the plurality of sensor electrodes, the processing system configured to:

drive modulation signals onto the conductive back plate; and receive resulting current signals with at least one of the plurality of sensor electrodes, the resulting current signals comprising effects corresponding to the modulation signals and induced in the at least one of the plurality of sensor electrodes from the conductive back plate;

wherein the modulation signals cause the conductive back plate and the input object to be modulated with respect to system ground;

wherein the resulting current signals are received while holding the at least one of the plurality of sensor electrodes with which resulting current signals are received at a constant voltage with respect to the system ground, while simultaneously driving a display element of the plurality of display elements for providing display image update information to the display element;

wherein the display element comprises a capacitor having as one plate, a portion of the at least one electrode of the plurality of sensor electrodes held at the constant voltage with respect to the system ground;

wherein the resulting current signals are required to hold the at least one electrode of the plurality of sensor electrodes at the constant voltage with respect to the system ground when the input object is modulated with respect to the at least one electrode of the plurality of sensor electrodes by the modulation signals; and wherein the constant voltage is different from the system ground and an earth ground.

2. The input device of claim 1, wherein the input device further comprises:
a plurality of source driver electrodes; and
a plurality of gate electrodes;
wherein each sensor electrode of the plurality of sensor electrodes comprises one or more of the pluralities of gate electrodes and source electrodes.

3. The input device of claim 1, wherein each sensor electrode of the plurality of sensor electrodes comprises one or more display electrodes of the display device.

4. The input device of claim 1, wherein the input device further comprises:
a segmented electrode that is common to multiple pixels of the display device,
wherein each sensor electrode of the plurality of sensor electrodes comprises one or more segments of the segmented electrode.

5. The input device of claim 1, wherein the input device further comprises:
a plurality of source driver electrodes; and
a plurality of gate driver electrodes;
wherein the processing system is further coupled to the plurality of source driver electrodes and the system ground; and
wherein the processing system is further configured to:
drive the modulation signals onto the conductive backplate and receive the resulting signals during a first period to determine changes in capacitive coupling between at least one of the sensor electrode and an input object,
drive a first gate electrode of the plurality of gate electrodes with a second signal during a second period; and
drive a first source driver electrode of the plurality of source driver electrodes with a third signal during a third period.

6. The input device of claim 5, wherein the processing system further comprises:
a source driver configured to drive the first source driver electrode; and
a capacitive sensing integrated circuit configured to drive the backplate with the modulation signal.

7. The input device of claim 5, wherein the first period, the second period, and the third period at least partially overlap.

8. The input device of claim 5, wherein the first period does not overlap with the second period and the third period.

9. The input device of claim 5, wherein the first gate electrode is driven with the second signal during the second period to select a pixel row of the display device for updating and wherein the first source driver electrode is driven with the third signal during the third period to update a pixel value of a pixel of the selected pixel row.

10. The input device of claim 1, wherein the processing system is further configured to determine positional information of the input object in a sensing region of the input device based on the resulting signals.

11. The input device of claim 1, wherein the plurality of sensor electrodes are disposed as a matrix.

12. The input device of claim 1 further comprising:
a device connection port coupled to the display device; and
a blocking filter coupled to the device connection port and to the system ground, and configured to reduce coupling of the system ground to earth ground when the input device is ohmically coupled or AC-coupled (alternating-current-coupled) to earth ground through the device connection port.

13. A method for capacitive sensing, the method comprising:
driving modulation signals onto a conductive back plate that is proximate to a display device, the display device having a plurality of display elements and an integrated capacitive sensing device; and receiving resulting current signals from at least one of a plurality of sensor electrodes that are included in the display device having the integrated capacitive sensing device, the resulting current signals comprising effects corresponding to the modulation signals and induced in the at least one of the plurality of sensor electrodes from the conductive back plate;

wherein the resulting current signals are received while holding the at least one of the plurality of sensor electrodes with which resulting current signals are received at a constant voltage with respect to the system ground, while simultaneously driving a display element of the plurality of display elements for providing display image update information to the display element;

wherein the display element comprises a capacitor having as one plate, a portion of the at least one electrode of the plurality of sensor electrodes held at the constant voltage with respect to the system ground;

wherein the resulting current signals are required to hold the at least one electrode of the plurality of sensor electrodes at the constant voltage with respect to the system ground when the input object is modulated with respect to the at least one electrode of the plurality of sensor electrodes by the modulation signals; and wherein the constant voltage is different from the system ground and an earth ground.

14. The method of claim 13, further comprising:
  driving the modulation signals onto the conductive backplate and receiving the resulting signals during a first period to determine changes in capacitive coupling between at least one of the sensor electrode and the input object,
  driving a first gate electrode of a plurality of gate electrodes in the display device with a second signal during a second period; and
  driving a first source driver electrode of a plurality of source driver electrodes in the display device with a third signal during a third period.

15. The method of claim 14, wherein the first period, the second period, and the third period at least partially overlap.

16. The method of claim 14, wherein the first period does not overlap with the second period and the third period.

17. The method of claim 14, further comprising filtering, from an electrical path between the system ground and a device connection port coupled to the display device, signals having a frequency that is similar to a frequency of the modulation signals.

18. A processing system for an input device, the processing system comprising:
  a modulation source configured to drive modulation signals onto a conductive back plate that is proximate to a display device, the display device having a plurality of display elements and an integrated capacitive sensing device; and
  a sensor module having sensing circuitry configured to receive resulting current signals from at least one of a plurality of sensor electrodes that are included in the display device having the integrated capacitive sensing device, the resulting current signals comprising effects corresponding to the modulation signals and induced in the at least one of the plurality of sensor electrodes from the conductive back plate, wherein the resulting current signals are received while holding the at least one of the plurality of sensor electrodes with which resulting current signals are received at a constant voltage with respect to the system ground, while simultaneously driving a display element of the plurality of display elements for providing display image update information to the display element;
  wherein the modulation signals cause the conductive back plate and an input object proximate to the at least one sensor electrode to be modulated with respect to system ground;
  wherein the display element comprises a capacitor having as one plate, a portion of the at least one electrode of the plurality of sensor electrodes is held at the constant voltage with respect to the system ground;
  wherein the resulting current signals when received hold the at least one electrode of the plurality of sensor electrodes at the constant voltage with respect to the system ground when the input object is modulated with respect to the at least one electrode of the plurality of sensor electrodes by the modulation signals; and
  wherein the constant voltage is different from the system ground and an earth ground.

19. The processing system of claim 18, further comprising:
  a display driver module;
  wherein the modulation source is configured to drive the modulation signals onto the conductive back plate during a first period;
  wherein the sensor module is configured to receive the resulting signals to determine changes in capacitive coupling between at least one of the sensor electrode and the input object during the first time period; and
  wherein the display driver module is configured to:
    drive a first gate electrode of a plurality of gate electrodes in the display device with a second signal during a second period, and
    drive a first source driver electrode of a plurality of source driver electrodes in the display device with a third signal during a third period.

20. The processing system of claim 19, wherein the first period, the second period, and the third period at least partially overlap.

21. The processing system of claim 19, wherein the first period does not overlap with the second period and the third period.

* * * * *